3,168,695
PRESSURE MEASURING DEVICE WITH AN AUXILIARY SPARK GAP IN A PRESSURE-TYPE CONTAINER
Elisha N. Fales, P.O. Box 4896, Washington, D.C.
Filed Sept. 9, 1960, Ser. No. 54,945
2 Claims. (Cl. 324—33)

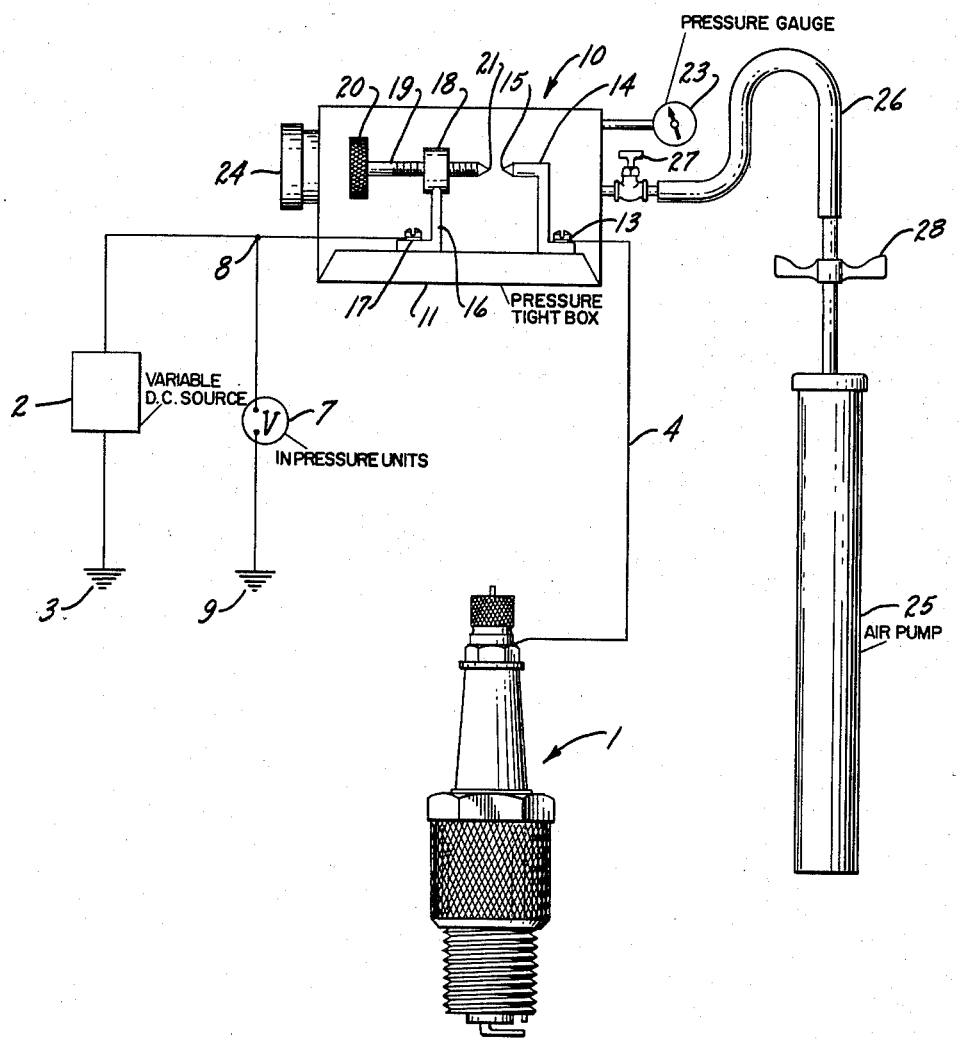

This invention relates in general to the calibration or standardization of an electronic pressure gauge which measures static pressure in an internal combustion engine as a function of spark flash-over voltage.

It has been found that compression of pressure within a combustion chamber might be measured by measuring the voltage drop across the incumbent spark plug gap and equating it with a predetermined relationship between voltage and compression pressure. This is accomplished, in general, by connecting a source of high voltage direct current to a spark plug in a cylinder to be tested and by means of a voltmeter in the conventional circuit measuring the voltage required to flash-over the spark plug gap within the cylinder.

At atmospheric pressure, that is, for example, when one of the cylinders' valves is open, the voltage required to induce a flash-over at the spark plug gap will be an arbitrary one of a specific magnitude. As the pressure in the cylinder increases during compression by the piston therein, the voltage required to induce this flash-over will increase. A determinable relationship will consequently exist between various flash-over voltages and their corresponding cylinder pressures. For such a relationship a voltmeter can be calibrated to read pressure directly rather than require a separate function of equation after the voltage has been determined in a particular cylinder.

As has been described above, the variable which has a primary effect upon the voltage required to induce a flash-over at a spark plug gap is that of cylinder pressure at the time of flash-over. Another variable which can be a nuisance at times, however, is that of nonstandardized spark plug gap and gaps varying from their pre-established setting as a result of firing erosion or the like. It will be plainly seen that a larger gap, whether at atmospheric pressure or higher pressure, will require a higher voltage to induce flash-over than will a relatively smaller gap. For example, suppose a voltmeter has been calibrated to read accurate compression or pressure in a standard engine in which a spark plug gap of .020 inch is called for. Without taking the plug out of the cylinder, if the pressure is measured with the aid of the aforedescribed device, and the spark plug is actually .023 inch as a result of one of a number of well-known circumstances, the pressure read will be substantially higher than the actual pressure in the cylinder since the voltage required to induce the flash-over at the spark plug gap will be a function not only of cylinder pressure, but also of a spark plug gap, which is greater than that anticipated.

Accordingly, the primary object of this invention is to provide a device for use in conjunction with the aforedescribed measuring system and/or device, which will standardize the readings of a pressure calibrated voltmeter to read pressure accurately regardless of the gap of the spark plug in the cylinder of the engine being tested.

Another object is to provide a standardizing device which can easily be inserted in a testing circuit of the aforedescribed character.

Still another object is to provide an auxiliary gap which can be adjusted to augment the spark plug gap and be subjected to conditions similar to those to which the spark plug gap is subjected to standardize the resulting voltage and consequently compression or pressure reading.

Yet another object is to provide a standardizing or calibrating device which is simple and inexpensive in construction and easy to use.

These and other objects of this invention will be found in the following specification and claims wherein like reference numerals identify like parts throughout.

The invention is illustrated more or less diagrammatically in the drawing wherein the figure shows this device in circuit with a standard spark plug.

Indicated generally at 1 in the figure is a conventional spark plug which might be operatively inserted in a cylinder of an internal combustion engine of a well-known construction (not shown). In a pressure testing device of the aforedescribed nature, a source of high voltage D.C. current, indicated generally by the numeral 2, is grounded on one side at 3 and adapted to be connected through circuit 4 to the spark plug 1. A voltmeter 7 is connected into the circuit as at 8 and grounded on the other side at 9. The standardization or calibration device which forms the basis of this invention is introduced into the circuit in series and is shown generally at 10.

The testing circuit 4 in conjunction with the voltmeter 7 is shown diagrammatically here, as opposed to the actual circuitry of the testing device as it is presently utilized; the actual device being somewhat more sophisticated. However, for purposes of describing this invention, suffice it to say that, in essence, the concept of the testing device is such that it involves basically a source of high voltage D.C. current connected to the spark plug with a pressure calibrated voltmeter appropriately arranged in the circuit.

The standardizing or calibrating device 10 includes a pressure-tight box 11 of any conventional construction. In lieu of a box, any pressure-tight container of satisfactory size might be utilized. Within the box, one lead of the circuit 4 coming from the conventional spark plug 1 is connected, as at 13, to an irregularly shaped arcing head 14 which has a conical arcing point 15 at its inner extremity. The lead from the high voltage source is connected within the pressurized container to an adjustable screw mounting 16, as at 17. Screw mounting 16 has an enlarged internally threaded head 18 into which adjusting screw 19, having a knurled gripping head 20 and a conical arcing point 21, is inserted. It will be obvious that the distance between the arcing points 21 and 15 is adjustable by merely turning the adjusting screw 19. Each of the arcing terminals 14 and 16 and the adjusting screw 19 are formed of high conductivity materials of a conventional nature. A standard pressure gauge 23 is situated in one wall of box 11. A pressure-tight door 24 of conventional construction is situated in the opposite wall of the box 11 in such a manner that access to the knurled head 20 of the adjusting screw 19 can be had through it.

A source of air pressure in the form of an air pump is shown generally at 25 and it is connected to the pressure-tight box 11 through pressure conduit 26 and valve 27. A hard pump handle 28 extends from the air pump 25 and can be manipulated in a conventional manner to pressurize the box 11.

The use and operation of this invention are as follows:

As has been made clear in the foregoing discussion, with a testing device of this nature a voltmeter must first be calibrated to read correct cylinder pressure as a function of the voltage required to induce spark plug gap flash-over. When the voltage varies solely as a function of varying cylinder pressure, such a calibration of a voltmeter is no problem. But, when the exact spark plug gap is not known, for one or more reasons, any such calibration will give an inaccurate voltage and consequently pressure reading. In this setting then, the device embodying this invention finds utility.

For example, not knowing exactly what the spark plug gap of a seated plug actually is, a testing device including the standardizing or calibrating means embodying this invention can be utilized. The combined system is, in itself, standardized in the following manner. Assume that the electrical circuit of the pressure gauge system has been connected to a clean, new spark plug of conventional design with about .020 inch gap between its points. The adjustable gap could then be set at about .005 inch gap between its points. With the engine not running and both gaps at atmospheric pressure, suppose voltage is now increased until flash-over occurs, that voltage thereupon being (E) volts. A suitable voltmeter is then calibrated such that it reads zero at (E) volts. The next step in the calibration is to apply a pressure to the cylinder by using the starter, for example. Flash-over voltage is now greater and equals ($E^1$) and the voltmeter will read on its scale the pressure corresponding. By repeating this several times for different pressures which must be known, a calibration curve is established and any reading of the voltmeter can be interpreted to terms of cylinder pressure. This reading is, of course, a function of the actual spark plug gap plus the adjustable standardizing device gap.

This voltmeter calibration then belongs to the particular gap tested. In this instance, the voltmeter calibrated in terms of pressure would read a proper pressure as long as a total gap of .025 inch was present between the spark plug points and the adjustable points. It will thus be seen that by means of the auxiliary gap we can use the calibration curve and consequently the calibrated voltmeter for all spark plugs by varying the auxiliary gap.

Suppose we attach our testing device with its included standardizing equipment to the spark plug of a conventional engine and supply the plug with a high enough direct current voltage to induce flash-over at both the adjustable gap and the spark plug gap while the cylinder is at atmospheric pressure. Upon reading the voltmeter, it appears that a pressure less than atmospheric pressure is present in the cylinder since the voltmeter might read below zero. This would be an indication that the spark plug gap is less than .020 inch. Exactly what the gap is is actually unimportant, since the adjustable gap would be increased from .005 inch to a gap that would cause the voltmeter to read zero pressure. The total gap between the adjustable gap and the spark plug gap is thus .025 inch again, although this is actually not measured by the operator of the device.

Now, as compression in the engine's cylinder is increased by turning the crank shaft, a correct increased pressure may be read on the voltmeter as the voltage required to bridge the gap of the spark plug grows higher in response to this increased pressure. To maintain a substantially equal pressure around the adjustable gap, the pressure-tight box 11 is supplied with air under pressure from the air pump 25 and the pressure in the box is co-ordinated by watching gauge 23 with the pressure read on the voltmeter 5. A slight lag will always remain in the actual pressure of the box 11, as compared to the pressure in the cylinder since the pressure in the box can only be increased by increments, but the effect on accuracy is insignificant.

Other variables, including the effect of temperature in the cylinder upon the spark plug gap, may induce smaller negligible errors in the final pressure reading but they have been found to be insignificant. The standardizing device embodying this invention in combination with a testing device of the type hereinbefore described provides a rapid means for accurately measuring the pressure in a cylinder or cylinders of an internal combustion engine. It is simple in construction and inexpensive to adapt for use with such a testing device.

What has been described is a standardization or calibrating device which may vary considerably as far as number and disposition of parts are concerned, without departing from the theory of the invention. Accordingly, it is intended that the foregoing description be illustrative only and not definitive and that the scope of the invention be limited only by the appended claims.

I claim:

1. A pressure measuring device including a source of high voltage direct current adapted to be connected through a circuit to the spark plug of a cylinder in an internal combustion engine, a voltage measuring device in said circuit, said voltage measuring device being calibrated in pressure units so as to indicate the value of the voltage required to induce flash-over in the spark plug in terms of pressure in said cylinder, said voltage measuring device being calibrated to read correct pressure for said spark plug having a predetermined gap, an auxiliary gap in said circuit in series with said spark plug gap, said auxiliary gap enclosed in a pressure-tight container, means for increasing the pressure in said pressure-tight container, and said auxiliary gap adapted to be adjusted to complement said spark plug gap so as to compensate for variations from said predetermined gap to insure proper reading of said pressure calibrated voltage measuring device across both gaps.

2. A pressure measuring device including a source of high voltage direct current adapted to be connected through a circuit to the spark plug of a cylinder in an internal combustion engine, a voltage measuring device in said circuit, said voltage measuring device being calibrated in pressure units so as to indicate the value of the voltage required to induce flash-over in said spark plug in terms of pressure in said cylinder, said voltage measuring device being calibrated to read correct pressure for said spark plug having a predetermined gap, an auxiliary gap in said circuit in series with said spark plug gap, said auxiliary gap adjustable to compensate for variations in the predetermined gap of said spark plug, said auxiliary gap enclosed in a pressure-tight container, means for pressurizing said container including an air pump, means for reading the pressure in said container, said container adapted to be pressurized to a pressure equivalent to the pressure read on said pressure calibrated voltage measuring device so as to substantially eliminate error in said cylinder pressure reading due to a difference in the pressure under which said auxiliary gap flashes over as compared to the pressure under which said spark plug gap flashes over.

References Cited in the file of this patent

UNITED STATES PATENTS

| | | |
|---|---|---|
| 1,140,816 | Harlan | May 25, 1915 |
| 1,497,750 | Hopkins | June 15, 1924 |
| 1,834,990 | Zeller | Dec. 8, 1931 |
| 2,653,472 | Gibson | Sept. 29, 1953 |